US008995067B2

(12) United States Patent
Dinesen

(10) Patent No.: US 8,995,067 B2
(45) Date of Patent: Mar. 31, 2015

(54) LENS DRIVING DEVICE

(75) Inventor: Palle Geltzer Dinesen, Shenzhen (CN)

(73) Assignees: AAC Acoustic Technologies (Shenzhen) Co., Ltd., Shenzhen (CN); American Audio Components Inc., La Verne, CA (US)

( * ) Notice: Subject to any disclaimer, the term of this patent is extended or adjusted under 35 U.S.C. 154(b) by 330 days.

(21) Appl. No.: 13/438,719

(22) Filed: Apr. 3, 2012

(65) Prior Publication Data

US 2013/0176634 A1    Jul. 11, 2013

(51) Int. Cl.
*G02B 7/04* (2006.01)
*G02B 7/08* (2006.01)
*H02K 41/035* (2006.01)
*G03B 3/10* (2006.01)
*G03B 5/00* (2006.01)

(52) U.S. Cl.
CPC ............. *G02B 7/08* (2013.01); *H02K 41/0356* (2013.01); *G03B 3/10* (2013.01); *G03B 5/00* (2013.01); G03B 2205/0069 (2013.01)
USPC ........................................................ 359/824

(58) Field of Classification Search
USPC .................................. 359/694, 696, 821–824
See application file for complete search history.

(56) References Cited

U.S. PATENT DOCUMENTS 7,791,827 B2 * 9/2010 Lam et al. ..................... 359/824

* cited by examiner

*Primary Examiner* — Joseph P Martinez
(74) *Attorney, Agent, or Firm* — Anova Law Group, PLLC

(57) ABSTRACT

An lens holding device is disclosed. The lens holding device includes a lens barrel defining a closed sidewall, an engaging hole surrounded by the closed sidewall for receiving a lens group, and a coil holder extending from one end of the lens holder. The lens holding device is configured to be one-piece. The disclosure further provides a lens driving device having the lens holding device.

9 Claims, 4 Drawing Sheets

LENS DRIVING DEVICE

FIELD OF THE INVENTION

The present invention relates to a lens driving device, and particularly to a lens driving device having an integrated lens holder.

DESCRIPTION OF RELATED ART

A typical lens driving device includes a lens module, a coil directly wound around an outer circumferential surface of the lens module, a stationary magnetic field generator separated from the coil and interacted with the coil for generating an electromagnetic force for driving the coil together with the lens module to move approaching or away along the optical axis, and at least one elastic member attached to the stationary magnetic field generator and the lens module, respectively. The lens module defines a lens group and a lens barrel accommodating the lens group therein.

The movable magnetic field generator interacts with the coil to generate an electromagnetic force for driving the coil to move approaching or away along the optical axis, thereby driving the lens module to move approaching or away along the optical axis.

However, as the coil is directly wound around the lens barrel, it causes an issue that the coil deforms the lens barrel during the winding process.

So, it is necessary to provide a new lens holding device for solving the problem mentioned above.

DETAILED DESCRIPTION OF THE EMBODIMENT

Reference will now be made to describe an exemplary embodiment of the present invention in detail.

Figure 1:
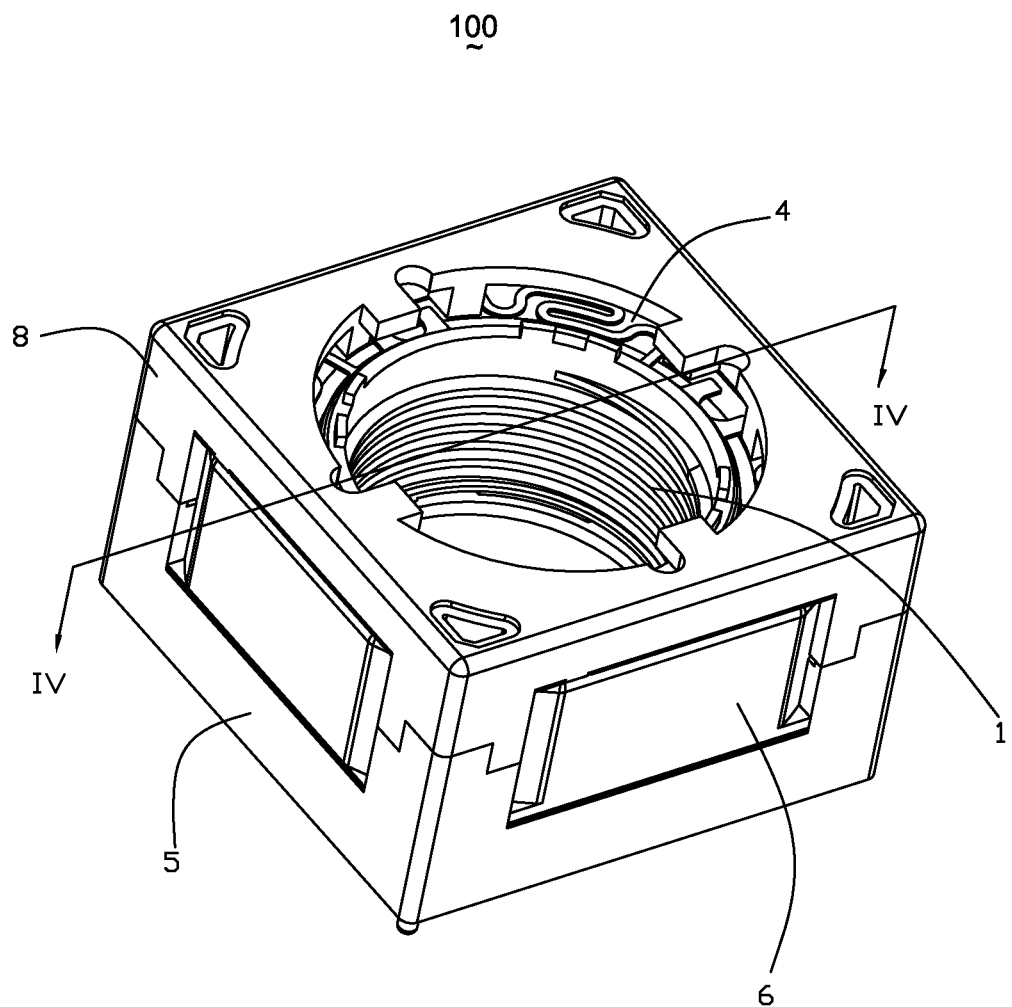
FIG. 1 is an illustrative assembled view of a lens driving device in accordance with an exemplary embodiment of the present invention.

Referring to FIGS. 1 though 4, a lens driving devices 100 comprises a stationary magnetic field generator (not labeled) having a receiving chamber (not labeled), at least one elastic member 4 attached to the stationary magnetic field generator generator, a movable magnetic field generator (not labeled) suspended in the receiving chamber by the elastic member 4. The movable magnetic field generator defines a lens holding device 1 and a coil 2 attached on the lens holding device 1. The stationary magnetic field generator is separated from the movable magnetic field generator for generating an electromagnetic force for driving the movable magnetic field generator to move approaching or away along an optical axis of the lens.

Figure 3:
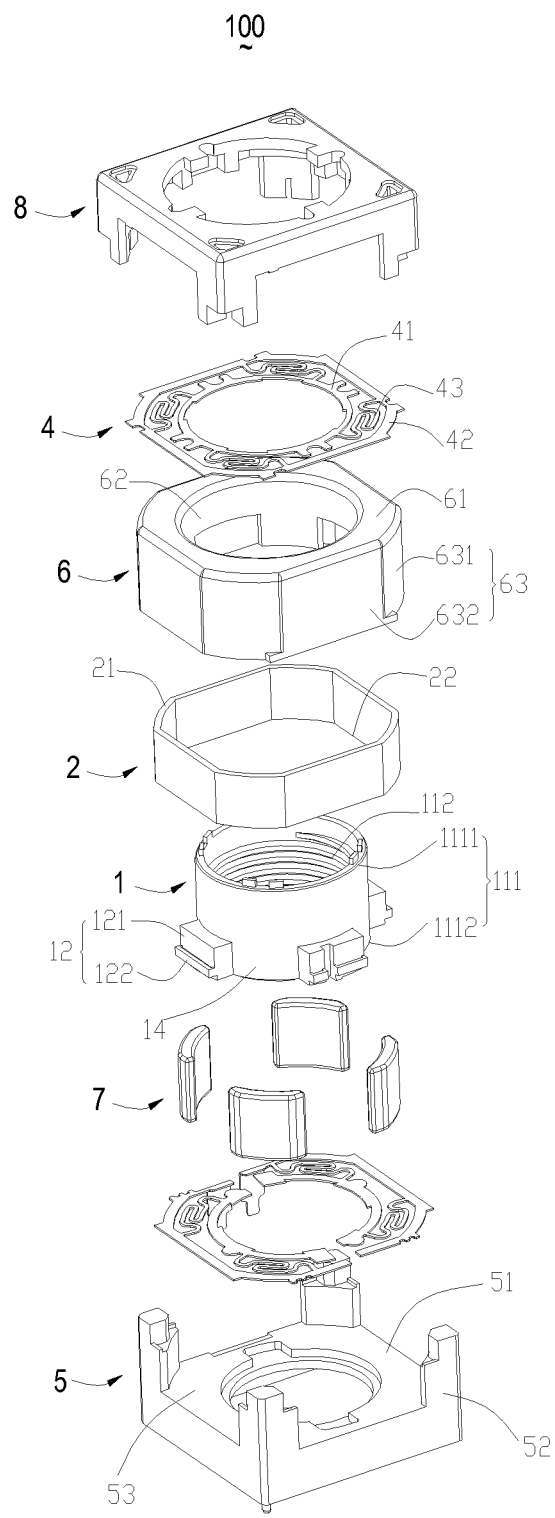
FIG. 3 is an exploded view of the lens driving device.

Referring to FIG. 3, the stationary magnetic field generator defines a housing (not labeled), a octagonal-shaped yoke 6 mounted on the housing, four magnets 7 received in the yoke 6, and a receiving chamber surrounded by the housing and the yoke 6 for receiving the coil 2 and the lens holding device 1.

Referring to FIG. 3, the housing defines a base 5 and a cover 8 mounted on the base 5. The base 5 defines a bottom 51, four side portions 52 extending upwardly and perpendicularly from corresponding four corners of the bottom 51 and spaced apart from each other, and four receiving gaps 53 formed by each adjacent side portions 52. The yoke 6 defines a flat wall portion 61, an inner peripheral portion 62 extending from the flat wall portion 61, and an outer peripheral portion 63 extending from the flat wall portion 61 and spaced apart from the inner peripheral portion 62. The outer peripheral portion 63 defines four arc-wall portions 631 set in space with respect to each other for engaging with the corresponding side portions 52 of the base 5 and four linear portions 632 smoothly connected each adjacent arc-wall portion 631 and received in the corresponding receiving gap 53 of the base 5, respectively. The inner peripheral portion 62 of the yoke 6 is annularly shaped. Each of magnets 7 is substantially triangularly shaped as viewed from the plane and fitted into a respective arc-wall portion 631 of the outer peripheral wall 63 of the yoke 6.

Figure 4:
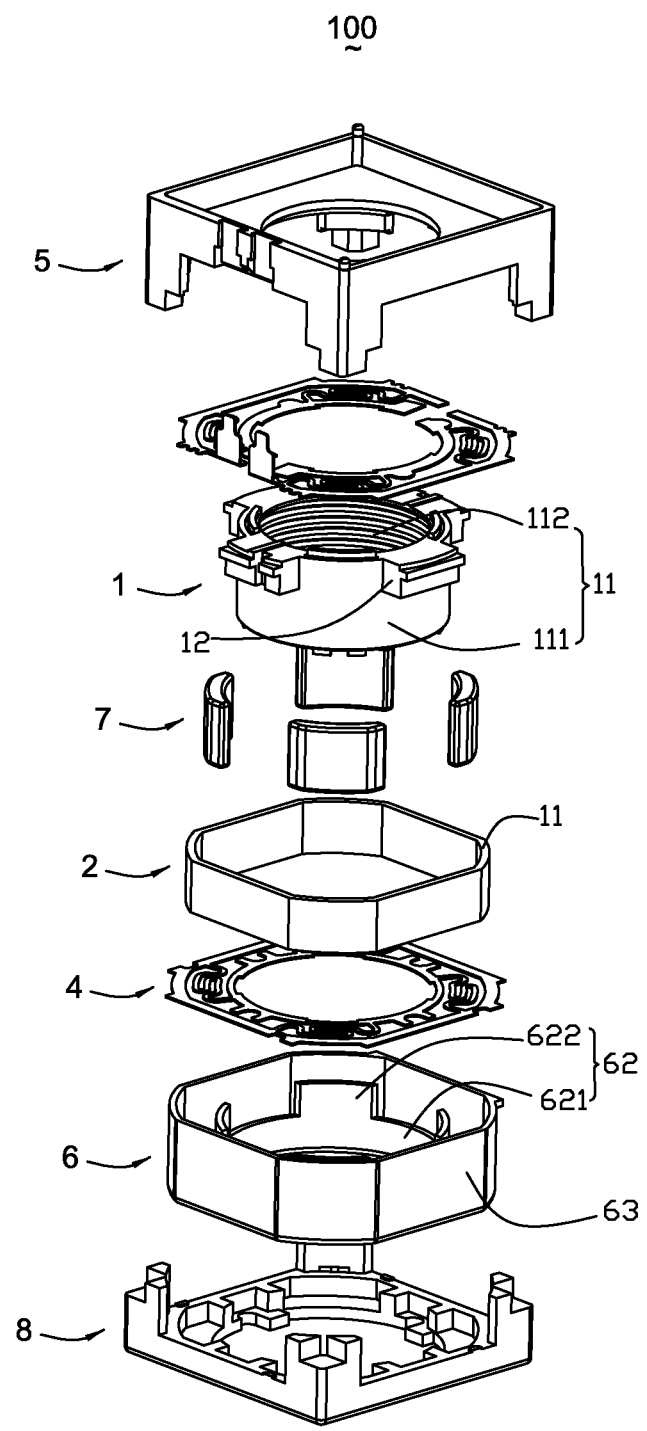
FIG. 4 is similar FIG. 3, but from another aspect.

Referring to FIGS. 3 and 4, the lens holding device 1 defines a lens group (not shown), a cylindrical lens barrel 11 receiving the lens group, and a coil holder 12 extending from one end of the lens barrel 11. The lens group defines a plurality lens separated with each other in the optical axis. The cylindrical lens barrel 11 defines a closed sidewall 111, an engaging hole 112 surrounded by the closed sidewall 111 for receiving a plurality of lens, i.e., the lens group. The closed sidewall 111 of the lens barrel 11 defines a first end 1111 near the base 5 and a second end 1112 far away from the base 5. The coil holder 12 defines a supporting portion 121 extending from the first end 1111 of the closed sidewall 111 of the lens holder 11 and a supporting step 122 extending from the supporting portion 121 and away from the engaging hole 112 of the lens barrel 11 for fixing the coil 2 together with the supporting portion 121. The lens holding device 1 is configured as one-piece. The lens barrel 11, the coil holder 12 and the lens group may be manufactured by injection molding.

Figure 2:
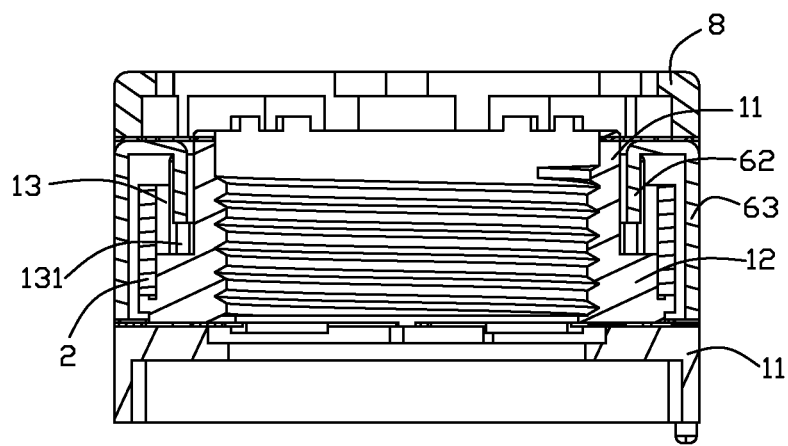
FIG. 2 is an enlarged cross-sectional view of the speaker taken along line IV-IV in FIG. 1.

Referring to FIGS. 2 though 4, the coil 2 is columned configuration and made of metal wire, such as copper wire. The coil 2 defines an upper end 21 and a lower end 22 opposite to the upper end 21. When assembled, a lower end 22 of the coil 2 is engaged with the supporting portion 121 and the supporting step 122. The lens driving device 1 further defines a inserting space 13 surrounded by the coil 2, the coil holder 12 and together with an outer peripheral of the closed sidewall 111 of the lens barrel 11 for receiving the inner peripheral portion 62 of the yoke 6. A height of the closed sidewall 111 of the lens barrel 11 is larger than that of the supporting portion 121 adding a height of the inner peripheral wall portion 62 of the yoke 6. Therefore the inserting space 13 defines a vibrating space 131 placed between an outer peripheral of the closed sidewall 111, an upper surface of the supporting portion 121 and a lower surface of the inner peripheral wall portion 62 of the yoke 6 in the optical axis for ensuring the lens holding device 1 together with the coil 2 move approaching or away along the optical axis.

Referring to FIGS. 3 and 4, in this exemplary embodiment, the coil holder 12 is divided into four coil holder segments (no labeled). Each adjacent coil holder segments together with the closed sidewall 111 of the lens barrel 11 defines an extending space 14. The inner peripheral portion 62 of the yoke 6 defines an annular portion 621 and four extending portion 622 extending from the annular portion 621 and away from the flat wall portion 61 of the yoke 6 at a position corresponding to the respective arc-wall portion 631 of the outer peripheral portion 63 of the yoke 6. Therefore, a height of the inner peripheral portion at a position corresponding to each arc-wall portion of the outer peripheral portion is larger than that of the inner peripheral portion at a position corresponding to each linear portion of the outer peripheral portion. Each extending portion 622 of the inner peripheral portion 62 of the yoke 6 is inserted into the respective extending space 14 of the lens holding device 1, thereby enhancing the electromagnetic force for driving the coil 2.

Referring to FIG. 3, the elastic member 4 defines an inner portion 41, an outer portion 42 separated from the inner portion 41 and having a diameter that is larger than that of the inner portion 41, and a connecting portion 43 connected with the inner and outer portions 41 and 42 and set in a space between these portions 41 and 42, respectively. The outer portion 42 of the elastic member 4 is mounted on the flat wall portion 61 of the yoke 6 and the inner portion 41 is connected with the first end 1111 of the closed sidewall 111 of the lens holding device 1 for suspending the lens holding device 1 together with the coil 2 in the receiving chamber.

In order to fix the coil on the coil holder firmly, the coil holder further defines a outer wall extending from the supporting step toward the flat wall portion of the yoke for engaging with an outer peripheral of the coil. The mount of the magnets, the side portions of the base, the extending portions of the inner peripheral portion of the yoke, and the coil holder segments is not limited or restricted to four, and according to different desires, amount of these can be various.

The lens holding device has a lens barrel integrated with the coil holder, in which the pre-wind coil is then subsequently attached. This overcomes the issue of the coil deforming the lens barrel in the winding process. In addition, the space between the coil and the closed sidewall of the lens barrel allows a yoke with an inner peripheral portion to be fitted therein.

While the present invention has been described with reference to the specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A lens driving device, comprising:
   a stationary magnetic field generator defining a housing, a yoke received in the housing, the housing defining a receiving chamber, the yoke received in the receiving chamber and defining a flat wall portion and inner peripheral portion extending from the flat wall portion;
   at least one elastic member attached to the stationary magnetic field generator generator; and
   a movable magnetic field generator suspended in the receiving chamber by the elastic member and separated from the stationary magnetic field, the movable magnetic field generator defining a lens holding device received in the housing and a coil attached on the lens holding device, the lens holding device defining a lens barrel and a coil holder directly extending from one end of the lens barrel for holding the coil; the lens barrel defines a closed sidewall, an engaging hole surrounded by the closed sidewall for receiving a lens group;
   wherein the lens driving device further defines inserting space surrounded by the coil, the coil holder and an outer peripheral of the closed sidewall of the lens barrel receive the inner peripheral portion of the yoke; and
   wherein the lens barrel and the coil holder are integrated with each other.

2. The lens driving device as described in claim 1, wherein the coil holder defines a supporting portion extending from one end of the closed sidewall of the lens barrel and a supporting step extending from the supporting portion and away from the engaging hole of the lens barrel for fixing the coil together with the supporting portion.

3. The lens driving device as described in claim 2, wherein, the coil holder further defines a outer wall extending from the supporting step toward the another end of the closed sidewall for engaging with an outer peripheral of the coil.

4. The lens driving device as described in claim 3, wherein the coil holder is divided into plurality of coil holder segments and each adjacent coil holder segments together with the closed sidewall of the lens holder defines an extending space, the inner peripheral portion defines an annular portion and a plurality of extending portions extending from the annular portion away from the flat wall portion of the yoke inserted into the extending space for enhancing the electromagnetic force for driving the coil.

5. The lens driving device as described in claim 1, wherein the yoke further defines an outer peripheral portion extending from the flat wall portion and spaced apart from the inner peripheral portion, and the stationary magnetic field generator further defines a plurality of magnets attached on the outer peripheral portion of the yoke.

6. The lens driving device as described in claim 5, wherein the housing defines a bottom and a plurality of side portions extending upwardly and perpendicularly from the bottom and spaced apart from each other, and receiving gaps formed by each adjacent side portions.

7. The lens driving device as described in claim 6, wherein each of coil holder segment extends from the closed sidewall toward the corresponding receiving gap of the base.

8. The lens driving device as described in claim 7, wherein the outer peripheral portion of the yoke defines a plurality of arc-wall portions set in space with respect to each other for engaging with the corresponding side portion of the base, and a plurality of linear portions smoothly connected each adjacent arc-wall portion and received in the corresponding receiving gap of the base, respectively.

9. The lens holding device as described in claim 8, wherein each of the magnets is substantially triangularly shaped and fitted into a corresponding arc-wall portion of the outer peripheral wall of the yoke.

* * * * *